United States Patent [19]
Russell

[11] Patent Number: 6,109,188
[45] Date of Patent: Aug. 29, 2000

[54] VEHICULAR DESK STRUCTURE

[76] Inventor: Lester Russell, 20 Lorne Road, Southsea, Hampshire P05 1RR, United Kingdom

[21] Appl. No.: 09/258,321

[22] Filed: Feb. 25, 1999

[51] Int. Cl.[7] .................................................. A47B 23/00
[52] U.S. Cl. ............................................................. 108/44
[58] Field of Search ............................... 108/27, 44, 117, 108/120, 90, 55.3

[56] References Cited

U.S. PATENT DOCUMENTS

| | | | |
|---|---|---|---|
| 1,895,290 | 1/1933 | Lobel | 108/120 |
| 1,967,666 | 7/1934 | Fisher | 108/27 |
| 2,835,544 | 5/1958 | Dobkin | 108/120 |
| 4,051,787 | 10/1977 | Nishitani et al. | 108/55.3 |
| 4,503,780 | 3/1985 | Apissomian | 108/27 |
| 4,762,258 | 8/1988 | Murphy | 108/44 X |
| 5,325,794 | 7/1994 | Hontani | 108/117 |
| 5,339,748 | 8/1994 | Bilotti | 108/90 |
| 5,667,272 | 9/1997 | Sutton | 108/44 X |
| 5,878,672 | 3/1999 | Ostermann et al. | 108/44 |

*Primary Examiner*—Jose V. Chen

[57] ABSTRACT

A vehicular desk structure for providing a stable flat surface for resting objects thereon in a vehicle. The vehicular desk structure includes a tray with an elongate rod coupled to a bottom face of the tray. The upper ends of a pair of legs each have a tubular sleeve pivotally coupled thereto which are disposed around the rod to permit sliding of the upper ends of the legs along the rod and pivoting of the legs about the rod. The legs are pivotally coupled to one another at a pivot point between upper and lower ends of the legs.

20 Claims, 3 Drawing Sheets

VEHICULAR DESK STRUCTURE

BACKGROUND OF THE INVENTION

1. Field of the Invention

The present invention relates to vehicular desk structures and more particularly pertains to a new vehicular desk structure for providing a stable flat surface for resting objects thereon in a vehicle.

2. Description of the Prior Art

The use of vehicular desk structures is known in the prior art. More specifically, vehicular desk structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,615,620 by Owen; U.S. Pat. No. 1,964,339 by Brassell; U.S. Pat. No. 5,390,609 by McKee; U.S. Pat. No. 2,522,602 by Burns; U.S. Pat. No. 1,900,325 by Bayman et al.; and U.S. Pat. No. Des. 329,944 by Longtin.

While these devices fulfill their respective, particular objectives and requirements, the aforementioned patents do not disclose a new vehicular desk structure. The inventive device includes a tray with an elongate rod coupled to a bottom face of the tray. The upper ends of a pair of legs each have a tubular sleeve pivotally coupled thereto which are disposed around the rod to permit sliding of the upper ends of the legs along the rod and pivoting of the legs about the rod. The legs are pivotally coupled to one another at a pivot point between upper and lower ends of the legs.

In these respects, the vehicular desk structure according to the present invention substantially departs from the conventional concepts and designs of the prior art, and in so doing provides an apparatus primarily developed for the purpose of providing a stable flat surface for resting objects thereon in a vehicle.

SUMMARY OF THE INVENTION

In view of the foregoing disadvantages inherent in the known types of vehicular desk structures now present in the prior art, the present invention provides a new vehicular desk structure construction wherein the same can be utilized for providing a stable flat surface for resting objects thereon in a vehicle.

The general purpose of the present invention, which will be described subsequently in greater detail, is to provide a new vehicular desk structure apparatus and method which has many of the advantages of the vehicular desk structures mentioned heretofore and many novel features that result in a new vehicular desk structure which is not anticipated, rendered obvious, suggested, or even implied by any of the prior art vehicular desk structures, either alone or in any combination thereof.

To attain this, the present invention generally comprises a tray with an elongate rod coupled to a bottom face of the tray. The upper ends of a pair of legs each have a tubular sleeve pivotally coupled thereto which are disposed around the rod to permit sliding of the upper ends of the legs along the rod and pivoting of the legs about the rod. The legs are pivotally coupled to one another at a pivot point between upper and lower ends of the legs.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular desk structure apparatus and method which has many of the advantages of the vehicular desk structures mentioned heretofore and many novel features that result in a new vehicular desk structure which is not anticipated, rendered obvious, suggested, or even implied by any of the prior art vehicular desk structures, either alone or in any combination thereof.

It is another object of the present invention to provide a new vehicular desk structure which may be easily and efficiently manufactured and marketed.

It is a further object of the present invention to provide a new vehicular desk structure which is of a durable and reliable construction.

An even further object of the present invention is to provide a new vehicular desk structure which is susceptible of a low cost of manufacture with regard to both materials and labor, and which accordingly is then susceptible of low prices of sale to the consuming public, thereby making such vehicular desk structure economically available to the buying public.

Still yet another object of the present invention is to provide a new vehicular desk structure which provides in the apparatuses and methods of the prior art some of the advantages thereof, while simultaneously overcoming some of the disadvantages normally associated therewith.

Still another object of the present invention is to provide a new vehicular desk structure for providing a stable flat surface for resting objects thereon in a vehicle.

Yet another object of the present invention is to provide a new vehicular desk structure which includes a tray with an elongate rod coupled to a bottom face of the tray. The upper ends of a pair of legs each have a tubular sleeve pivotally coupled thereto which are disposed around the rod to permit sliding of the upper ends of the legs along the rod and pivoting of the legs about the rod. The legs are pivotally coupled to one another at a pivot point between upper and lower ends of the legs.

Still yet another object of the present invention is to provide a new vehicular desk structure that can have various upper surfaces to suit the needs of a user.

Even still another object of the present invention is to provide a new vehicular desk structure that is positionable on a passenger seat adjacent the driver of the vehicle so that the driver may place items thereon such as mobile telephones and a laptop computers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
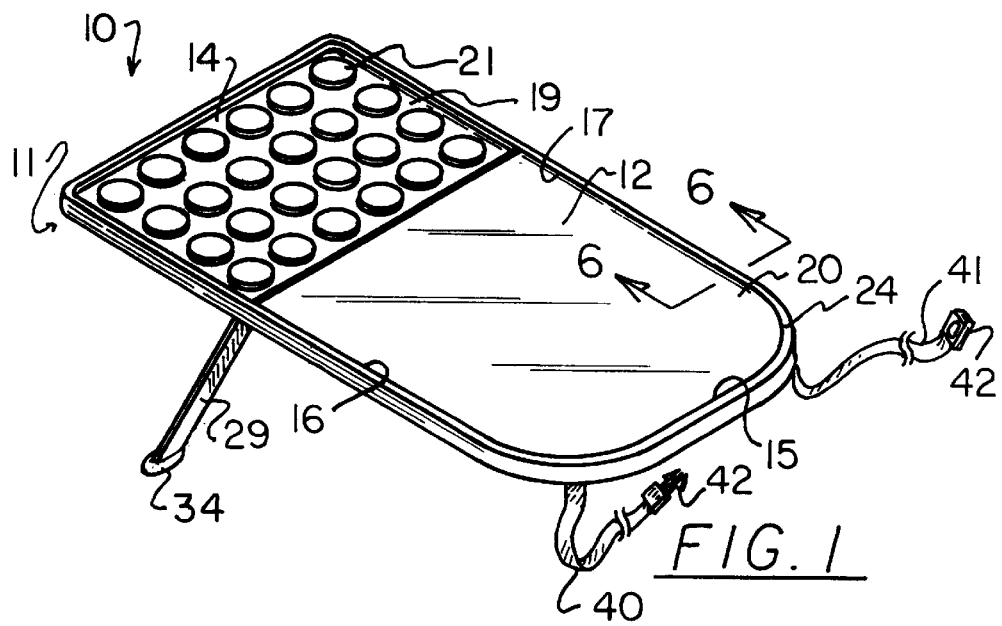
FIG. 1 is a schematic perspective view of a new vehicular desk structure according to the present invention.

With reference now to the drawings, and in particular to FIGS. 1 through 6 thereof, a new vehicular desk structure embodying the principles and concepts of the present invention and generally designated by the reference numeral 10 will be described.

As best illustrated in FIGS. 1 through 6, the vehicular desk structure 10 generally comprises a tray with an elongate rod coupled to a bottom face of the tray. The upper ends of a pair of legs each have a tubular sleeve pivotally coupled thereto which are disposed around the rod to permit sliding of the upper ends of the legs along the rod and pivoting of the legs about the rod. The legs are pivotally coupled to one another at a pivot point between upper and lower ends of the legs.

In closer detail, the desk structure 10 comprises a generally rectangular tray 11 with substantially planar top and bottom faces 12,13, and an outer perimeter comprising substantially straight front and back end edges 14,15, a pair of substantially straight side edges 16,17 extending between the front and back end edges of the tray and a plurality of corners. Preferably, the front and back end edges of the tray are extended substantially parallel to one another and the side edges of the tray are extended substantially parallel to one another and substantially perpendicular to the front and back end edges of the tray. Ideally, the corners of the outer perimeter of the tray are rounded to help avoid their poking into adjacent structures such as the backrest of a passenger seat in a vehicle.

Figure 4:
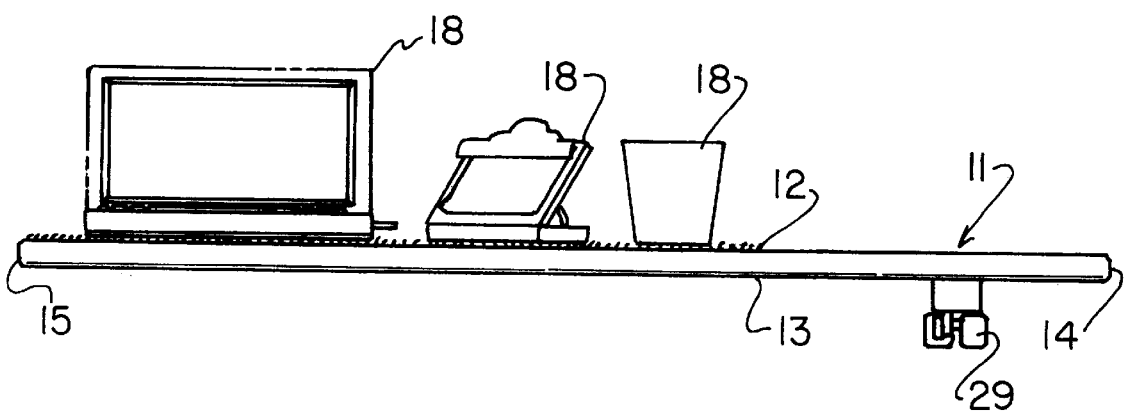
FIG. 4 is a schematic side view of the present invention with the legs collapsed.
Figure 5:
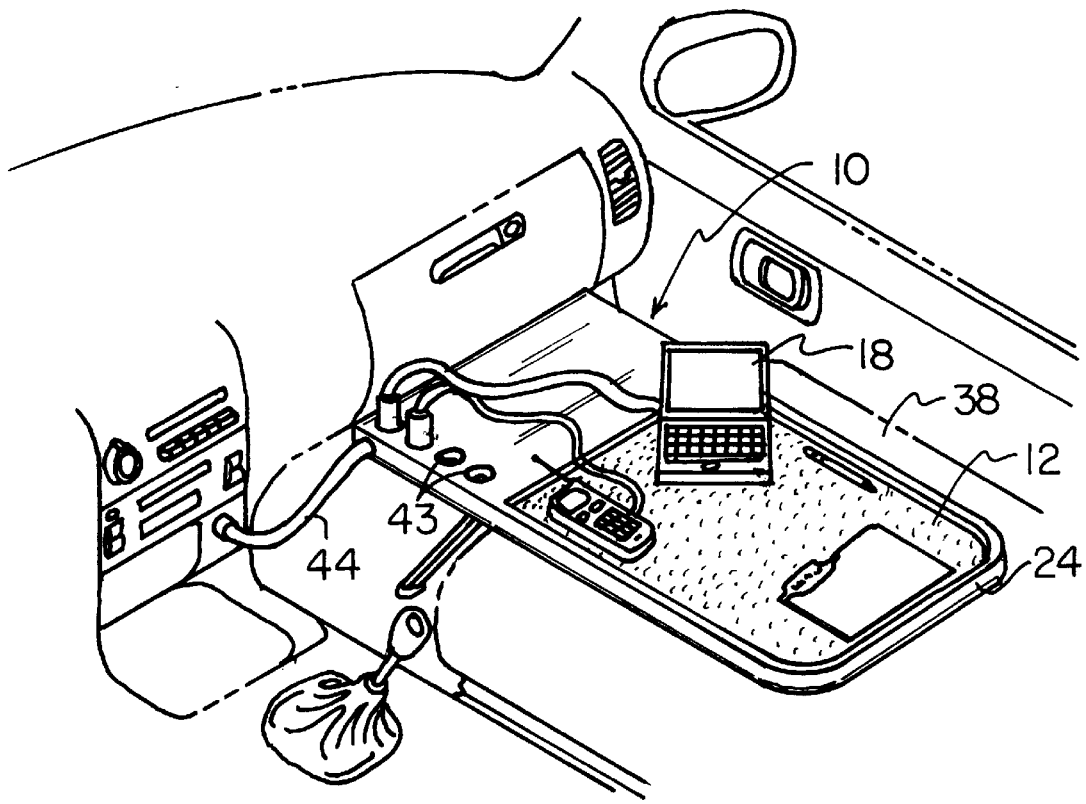
FIG. 5 is a schematic perspective view of an optional embodiment of the present invention in use.

In use, the top face of the tray is designed for resting items 18 thereon as best illustrated in FIG. 4 and 5. With reference to FIG. 1, in one preferred embodiment, the top face of the tray has a line extending between the side edges of the tray dividing the top face into generally rectangular front and back regions 19,20. In this embodiment, the front region of the top face of the tray has a plurality of generally disk-shaped nubs 21 upwardly extending therefrom. The nubs of the front region of the top face each comprise a resiliently deformable material such as a resiliently deformable rubber material for frictionally enhancing contact between the top face of the tray and items resting on the front region of the tray so that the items do not easily slide off of the front region of the top face of the tray. In this embodiment, the back region of the top face of the tray comprises a substantially smooth surface.

Figure 6:
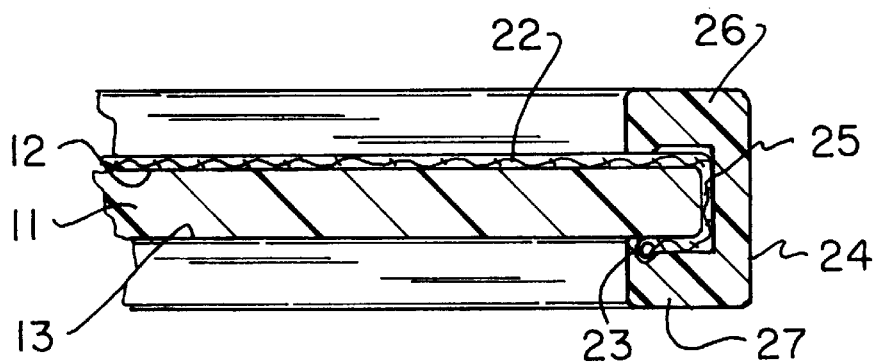
FIG. 6 is a schematic cross sectional view of the present invention taken from line 6—6 of FIG. 1 with a cover included covering the top face of the tray.

In another preferred embodiment, a flexible cover 22 is provided to substantially cover the top face of the tray. With reference to FIG. 6, the cover has an outer periphery that is wrapped around the outer perimeter of the tray. The cover preferably has an elastomeric band 23 along the outer periphery of the cover. The elastomeric band of the cover constricts the outer periphery of the cover adjacent the bottom face of the tray to help hold the cover on the top face of the tray. In one ideal version of this embodiment, the cover comprises a loops portion of a hooks and loops fastener such that items has a hooks portion of the hooks and loops fastener are detachably attachable to the cover when rested on the top face of the tray. In another ideal version of this embodiment, the cover comprises a resiliently deformable material such as the resiliently deformable material used to make non-slip drawer cover.

As best illustrated in FIGS. 1 and 6, a resiliently elastic lip band 24 is provided preferably having a generally C-shaped transverse cross section that defines an annular inner channel 25 along the lip band. The lip band is stretched around the outer perimeter of the tray such that the outer perimeter of the tray is inserted into the inner channel of the lip. As illustrated in FIG. 6, a portion of the cover adjacent the outer perimeter of the tray is positioned in the inner channel of the lip band such that the portion of the cover is interposed between the lip band and the outer perimeter of the tray to help hold the cover on the top face of the tray. The lip has an upper region 26 upwardly extending from a plane defined by the top face of the tray and a lower region 27 downwardly extending from a plane defined by the bottom face of the tray. In use, the upper region of the lip is designed for helping prevent items resting on the top face of the tray from sliding off of the tray.

Figure 3:
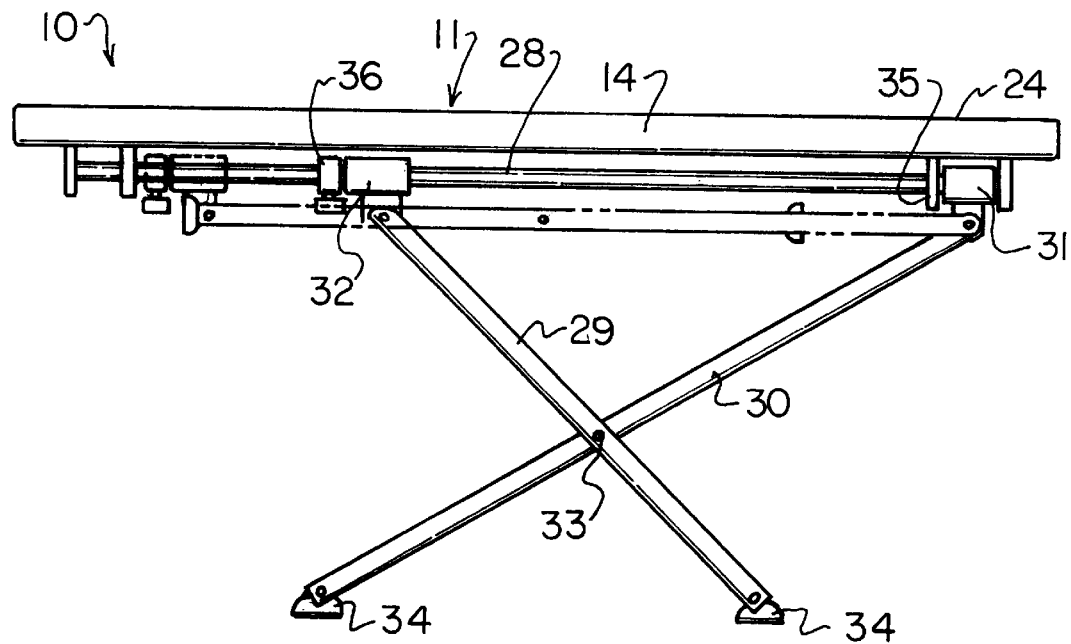
FIG. 3 is a schematic front end view of the present invention with the legs extended.

As best illustrated in FIG. 3, an elongate rod 28 is provided has a pair of opposite ends and a longitudinal axis extending between the ends of the rod. The ends of the rod is coupled to the bottom face of the tray towards the front end edge of the tray so that the rod is spaced below the bottom face of the tray. Preferably, the longitudinal axis of the rod is extended substantially parallel to the bottom face of the tray and to the front end edge of the tray.

A pair of elongate collapsible legs 29,30 are also provide each having upper and lower ends. The upper ends of the legs each has a generally cylindrical tubular sleeve 31,32 pivotally coupled thereto. The sleeves of the legs are disposed around the rod to permit sliding of the upper ends of the legs along the rod and pivoting of the legs about the rod. The legs are also pivotally coupled to one another at a pivot point 33 between the upper and lower ends of the legs. Preferably, the lower ends of the legs each have a resting foot 34 pivotally coupled thereto.

Preferably, the rod has a stop 35 towards a first of the ends of the rod. A sleeve of a first of the legs is positioned between the stop and the first end of the rod such that sleeve of the first leg is blocked from sliding past the stop of the rod when slid in a direction towards a second of the ends of the rod. Even more preferably, a sleeve of the second of the legs has a clamping device 36 for releasably holding the upper end of the second leg in a fixed position with respect to the rod so that the legs are releasable held against sliding along and rotation about the rod.

Figure 2:
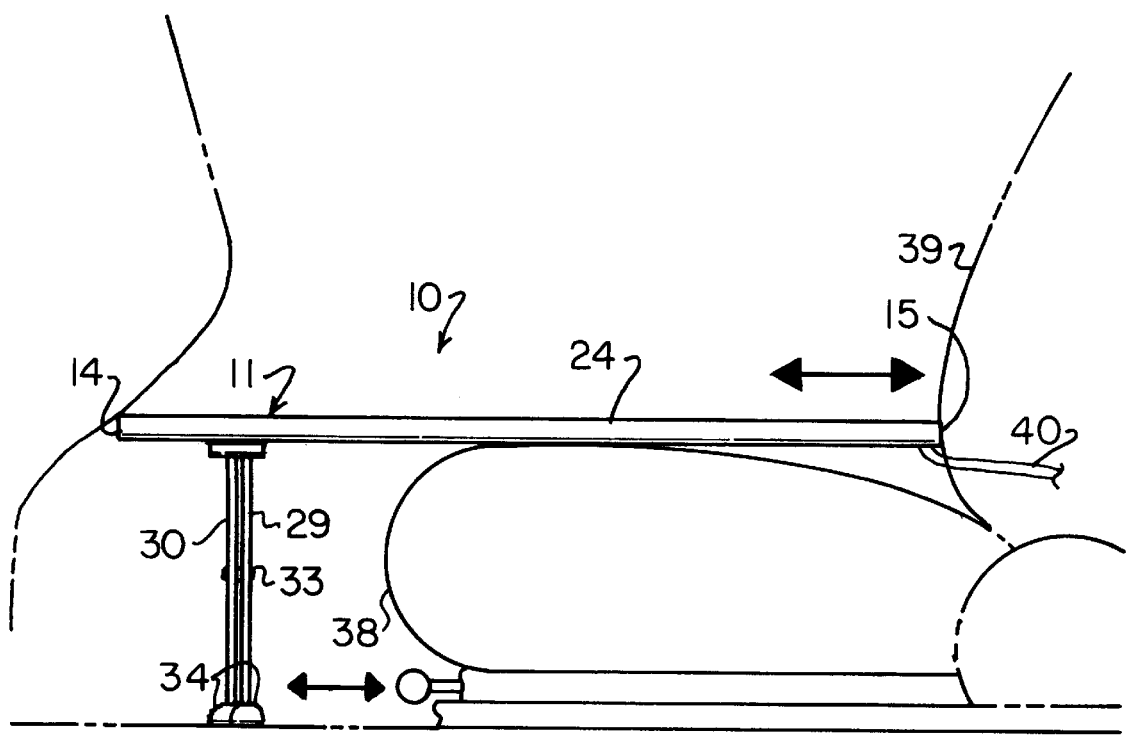
FIG. 2 is a schematic side view of the present invention in use.

The desk structure is designed for use in a vehicle having a passenger compartment with a floor portion 37, a seat 38 above the floor portion, and a backrest 39 upwardly extending from the seat. As best illustrated in FIGS. 2 and 5, the bottom face of the tray is rest on the seat of the vehicle such that the back end edge of the tray is positioned adjacent the backrest of the vehicle and the front end edge of the tray forwardly extends from the seat above the floor portion of the vehicle. The legs are downwardly depended from the tray towards the floor portion of the vehicle so that the resting feet of the legs are rested on the floor portion such that the legs support a portion of the tray above the floor portion of the vehicle.

Ideally, the tray has a pair of flexible straps whose free ends may be coupled together with a fastener 42 such as a buckle. In use, the straps may be wrapped around the back of the backrest or around the seat to help hold the desk structure in place on the seat.

With reference to FIG. 5, optionally, the top face of the tray may have a plurality of electrical receptacles 43 therein adjacent the front end edge of the tray. The electrical receptacles may be arranged in a row extending substantially parallel and adjacent the front end edge of the tray or in a row extending substantially parallel and adjacent one of the side edges of the tray. In this embodiment, the tray has an elongate flexible power cord 44 outwardly extending therefrom, the power cord is insertable into a electrical receptacle of the vehicle such as the cigarette lighter socket to electrically connect the electrical receptacles of the tray to a power supply of the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A desk structure for mounting on a seat of a vehicle, the seat having a lower cushion and a back cushion, said desk structure comprising comprising:

a tray having top and bottom faces, and an outer perimeter comprising front and back end edges, and a pair of side edges extending between said front and back end edges of said tray, a portion of the bottom face of the tray being for resting on a lower cushion of a vehicle;

an elongate rod having a pair of opposite ends and a longitudinal axis extending between said ends of said rod;

said ends of said rod being coupled to said bottom face of said tray;

said rod being spaced below said bottom face of said tray;

a pair of elongate legs, each leg having an upper end mounted to the bottom face of the tray, and each leg having a lower for resting on a floor surface adjacent to the seat of the vehicle;

said legs being adjustably extendable from the bottom face of the tray for adapting a height of the legs between the tray and the floor surface of the vehicle; and a strap assembly for releasably securing the tray to a back cushion of the seat on which the tray is rested;

wherein the legs are mounted adjacent to the front end edge of the tray for resting on the floor surface in front of the seat and the strap assembly is mounted adjacent to the back end edge of the tray for positioning adjacent to the back cushion of the seat such that the strap assembly may be wrapped around the back cushion;

wherein said upper ends of said legs each have a tubular sleeve pivotally coupled thereto, said sleeves of said legs being disposed around said rod to permit sliding of said upper ends of said legs along said rod and pivoting of said legs about said rod, said legs being pivotally coupled to one another at a pivot point between said upper and lower ends of said legs.

2. The desk structure of claim 1, wherein said outer perimeter of said tray further comprises a plurality of rounded corners.

3. The desk structure of claim 1, wherein said top face of said tray has front and back regions, wherein said front region of said top face of said tray has a plurality of generally disk-shaped nubs upwardly extending therefrom, and wherein said back region of said top face of said tray comprises a substantially smooth surface.

4. The desk structure of claim 3, wherein said nubs of said front region of said top face each comprise a resiliently deformable material.

5. The desk structure of claim 1, further comprising a flexible cover substantially covering said top face of said tray.

6. The desk structure of claim 5, wherein said cover has an outer periphery being wrapped around said outer perimeter of said tray.

7. The desk structure of claim 6, wherein said cover has an elastomeric band along said outer periphery of said cover, said elastomeric band of said cover constricting said outer periphery of said cover adjacent said bottom face of said tray to help hold said cover on said top face of said tray.

8. The desk structure of claim 5, wherein said cover comprises a loops portion of a hooks and loops fastener.

9. The desk structure of claim 5, wherein said cover comprises a resiliently deformable material.

10. The desk structure of claim 1, further comprising a resiliently elastic lip band, said lip band being stretched around said outer perimeter of said tray.

11. The desk structure of claim 10, wherein said lip band has a generally C-shaped transverse cross section defining an annular inner channel along said lip band, wherein said outer perimeter of said tray is inserted into said inner channel of said lip.

12. The desk structure of claim 1, wherein said rod has a stop towards a first of said ends of said rod, a sleeve of a first of said legs being positioned between said stop and said first end of said rod.

13. The desk structure of claim 12, wherein a sleeve of said second of said legs has a clamping device for releasably holding said upper end of said second leg in a fixed position with respect to said rod.

14. A desk structure system, comprising:
- a generally rectangular tray having substantially planar top and bottom faces, and an outer perimeter comprising substantially straight front and back end edges, and a pair of substantially straight side edges extending between said front and back end edges of said tray and a plurality of corners;
- said front and back end edges of said tray being extended substantially parallel to one another, said side edges of said tray being extended substantially parallel to one another and substantially perpendicular to said front and back end edges of said tray;
- wherein said corners of said outer perimeter of said tray are rounded;
- said top face of said tray having front and back regions;
- said back region of said top face of said tray comprising a substantially smooth surface;
- a flexible cover substantially covering said top face of said tray, said cover having an outer periphery being wrapped around said outer perimeter of said tray;
- said cover having an elastomeric band along said outer periphery of said cover, said elastomeric band of said cover constricting said outer periphery of said cover adjacent said bottom face of said tray to help hold said cover on said top face of said tray;
- said cover comprising a loops portion of a hooks and loops fastener;
- said cover comprising a resiliently deformable material;
- a resiliently elastic lip band having a generally C-shaped transverse cross section defining an annular inner channel along said lip band;
- said lip band being stretched around said outer perimeter of said tray such that said outer perimeter of said tray is inserted into said inner channel of said lip;
- a portion of said cover adjacent said outer perimeter of said tray being positioned in said inner channel of said lip band such that said portion of said cover is interposed between said lip band and said outer perimeter of said tray;
- said lip having an upper region upwardly extending from a plane defined by said top face of said tray;
- said lip having a lower region downwardly extending from a plane defined by said bottom face of said tray;
- an elongate rod having a pair of opposite ends and a longitudinal axis extending between said ends of said rod;
- said ends of said rod being coupled to said bottom face of said tray towards said front end edge of said tray;
- said rod being spaced below said bottom face of said tray, said longitudinal axis of said rod being extended substantially parallel to said bottom face of said tray and to said front end edge of said tray;
- a pair of elongate legs each having upper and lower ends;
- said upper ends of said legs each having a generally cylindrical tubular sleeve pivotally coupled thereto;
- said sleeves of said legs being disposed around said rod to permit sliding of said upper ends of said legs along said rod and pivoting of said legs about said rod;
- said legs being pivotally coupled to one another at a pivot point between said upper and lower ends of said legs;
- said lower ends of said legs each having a resting foot pivotally coupled thereto;
- said rod having a stop towards a first of said ends of said rod;
- a sleeve of a first of said legs being positioned between said stop and said first end of said rod;
- a sleeve of said second of said legs having a clamping device for releasably holding said upper end of said second leg in a fixed position with respect to said rod;
- a vehicle having a passenger compartment having a floor portion, a seat above said floor portion, and a backrest upwardly extending from said seat;
- said bottom face of said tray being rest on said seat of said vehicle such that said back end edge of said tray is positioned adjacent said backrest of said vehicle and said front end edge of said tray forwardly extends from said seat above said floor portion of said vehicle; and
- said legs being downwardly depended from said tray towards said floor portion of said vehicle, said resting feet of said legs being rested on said floor portion such that said legs support a portion of said tray above said floor portion of said vehicle;
- said top face of said tray having a plurality of electrical receptacles therein adjacent said front end edge of said tray, said electrical receptacles being arranged in a row extending substantially parallel and adjacent said front end edge of said tray or in a row extending substantially parallel and adjacent one of said side edges of said tray;
- said tray having an elongate flexible power cord outwardly extending therefrom, said power cord being insertable into a electrical receptacle of the vehicle such as the cigarette lighter socket to electrically connect said electrical receptacles of said tray to a power supply of the vehicle.

15. A desk structure for mounting on a seat of a vehicle, the seat having a lower cushion and a back cushion, said desk structure comprising comprising:
- a tray having top and bottom faces, and an outer perimeter comprising front and back end edges, and a pair of side edges extending between said front and back end edges of said tray, a portion of the bottom face of the tray being for resting on a lower cushion of a vehicle;
- an elongate rod having a pair of opposite ends and a longitudinal axis extending between said ends of said rod;
- said ends of said rod being coupled to said bottom face of said tray;
- said rod being spaced below said bottom face of said tray;
- a pair of elongate legs, each leg having an upper end mounted to the bottom face of the tray, and each leg having a lower for resting on a floor surface adjacent to the seat of the vehicle;

said legs being adjustable extendable from the bottom face of the tray for adapting a height of the legs between the tray and the floor surface of the vehicle; and a strap assembly for releasably securing the tray to a back cushion of the seat on which the tray is rested;

wherein the legs are mounted adjacent to the front end edge of the tray for resting on the floor surface in front of the seat and the strap assembly is mounted adjacent to the back end edge of the tray for positioning adjacent to the back cushion of the seat such that the strap assembly may be wrapped around the back cushion;

wherein said top face of said tray has a plurality of electrical receptacles therein adjacent said front end edge of said tray.

16. The desk structure of claim 15 wherein said electrical receptacles are arranged in a row extending substantially parallel and adjacent said front end edge of said tray or in a row extending substantially parallel and adjacent one of said side edges of said tray.

17. The desk structure of claim 15 wherein said tray has an elongate flexible power cord outwardly extending therefrom, said power cord being insertable into an electrical receptacle of the vehicle to electrically connect said electrical receptacles of said tray to a power supply of the vehicle.

18. The desk structure of claim 15, wherein said top face of said tray has front and back regions, wherein said front region of said top face of said tray has a plurality of generally disk-shaped nubs upwardly extending therefrom, and wherein said back region of said top face of said tray comprises a substantially smooth surface.

19. The desk structure of claim 15, further comprising a flexible cover substantially covering said top face of said tray.

20. The desk structure of claim 15, further comprising a resiliently elastic lip band, said lip band being stretched around said outer perimeter of said tray.

* * * * *